US011917360B1

(12) United States Patent
Babbar

(10) Patent No.: US 11,917,360 B1
(45) Date of Patent: Feb. 27, 2024

(54) LOUDSPEAKER TOWER AND SOUNDBAR

(71) Applicant: Ashok K. Babbar, Fremont, CA (US)

(72) Inventor: Ashok K. Babbar, Fremont, CA (US)

( * ) Notice: Subject to any disclaimer, the term of this patent is extended or adjusted under 35 U.S.C. 154(b) by 0 days.

(21) Appl. No.: 18/375,443

(22) Filed: Sep. 29, 2023

(51) Int. Cl.

| | |
|---|---|
| ***H04R 1/02*** | (2006.01) |
| ***H04R 1/22*** | (2006.01) |
| ***H04R 1/28*** | (2006.01) |
| ***H04R 3/12*** | (2006.01) |

(52) U.S. Cl.
CPC ............. *H04R 1/227* (2013.01); *H04R 1/025* (2013.01); *H04R 1/288* (2013.01); *H04R 3/12* (2013.01)

(58) Field of Classification Search
CPC ........ H04R 1/227; H04R 1/025; H04R 1/288; H04R 1/026; H04R 2201/02; H04R 2201/021; H04R 1/2892; H04R 2201/025
USPC ........................... 381/87, 333, 335–336, 345
See application file for complete search history.

(56) References Cited

U.S. PATENT DOCUMENTS

| | | | | | |
|---|---|---|---|---|---|
| 4,249,037 | A * | 2/1981 | Dexter | H04R 5/02 | 381/89 |
| 5,123,500 | A * | 6/1992 | Malhoit | H04R 1/2888 | 181/154 |
| 5,657,392 | A * | 8/1997 | Bouchard | H04R 1/02 | 381/345 |
| 8,428,284 | B2 * | 4/2013 | Meyer | H04R 1/323 | 381/345 |
| 9,351,059 | B1 * | 5/2016 | Suhre | H04R 1/2888 | |
| 10,469,044 | B1 * | 11/2019 | Hollabaugh | H03F 3/68 | |
| 2012/0241247 | A1 * | 9/2012 | Choe | H04R 1/345 | 264/153 |
| 2012/0288129 | A1 * | 11/2012 | Suhre | H04R 1/2803 | 381/345 |

* cited by examiner

*Primary Examiner* — Disler Paul
(74) *Attorney, Agent, or Firm* — Andre Grouwstra; GROUWSTRA IC & Software Patent

(57) ABSTRACT

A loudspeaker cabinet has a front panel, a back panel, and first and second panels connected with the front panel and the back panel. These four panels enclose a cabinet cavity that is elongated and tapered. The cabinet cavity has first and second openings at its far ends. One or more loudspeakers are mounted in the front panel. Damping material uniformly fills the cabinet cavity. The ratio of the fill density range and the material density is from 2.1 to 5%. If there are multiple loudspeakers, they can be equal and cover the full frequency range. They can be driven by a shared signal, without a crossover filter.

13 Claims, 8 Drawing Sheets

LOUDSPEAKER TOWER AND SOUNDBAR

BACKGROUND

Technical Field

The disclosed implementations relate generally to systems and methods used in loudspeaker systems, and in particular to those for high-end audio systems.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Most high-end loudspeaker systems use multiple speaker drivers to cover the range of frequencies that humans can perceive. The loudspeaker systems use crossover filters to split an amplifier output signal into separate bands, specific to frequency ranges covered by the individual speaker drivers. However, the crossover filters are not phase linear, which distorts the directional information, and also there is spillover between adjacent frequency bands, resulting in harmonic distortion.

BRIEF DESCRIPTION OF THE DRAWINGS

The invention will be described with reference to the drawings, in which.

Figure 1:
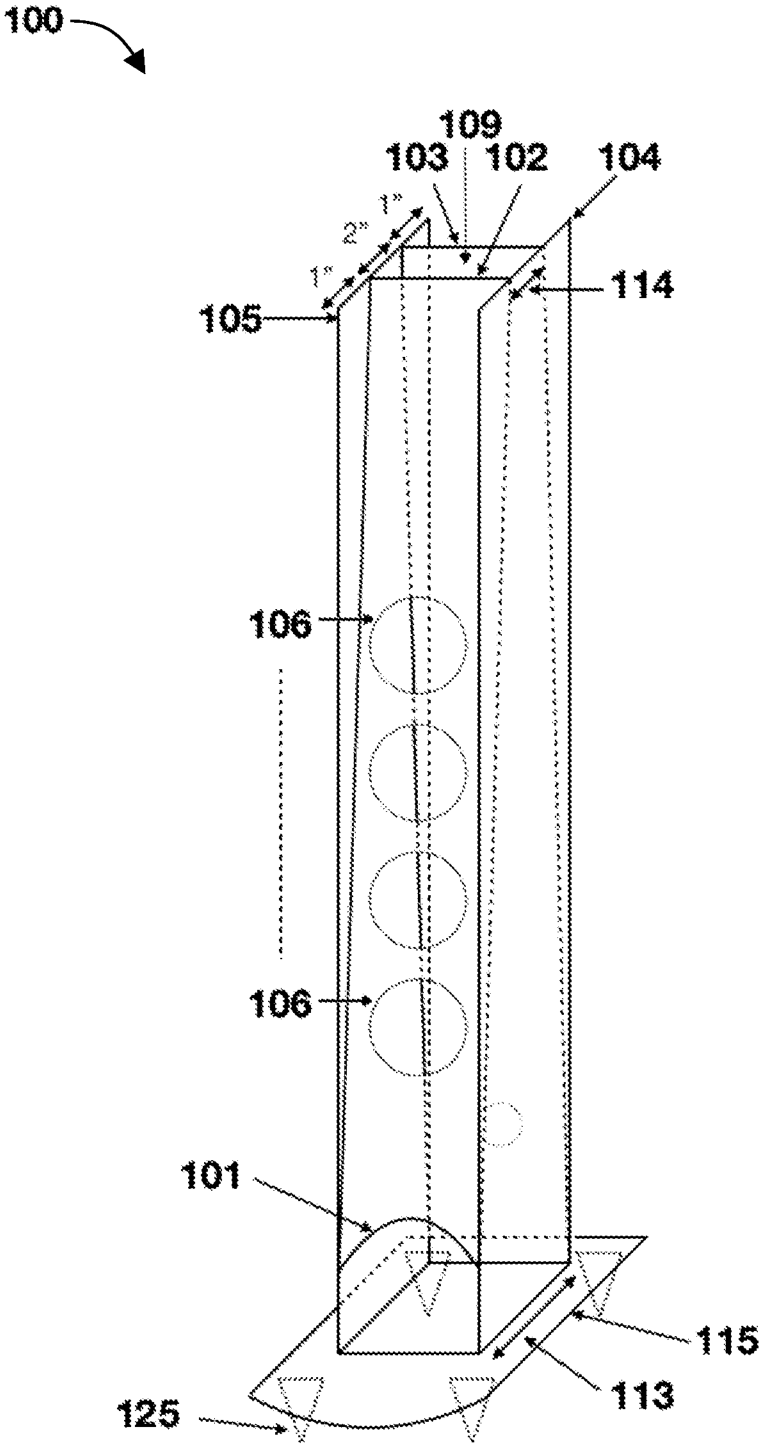
FIG. 1 illustrates an example loudspeaker cabinet shaped as a tower, in a three-dimensional view.

In the figures, like reference numbers may indicate functionally similar elements. The systems and methods illustrated in the figures, and described in the Detailed Description below, may be arranged and designed in a wide variety of different implementations. Neither the figures, nor the Detailed Description, are intended to limit the scope as claimed. Instead, they merely represent examples of different implementations of the invention.

DETAILED DESCRIPTION

Most high-end loudspeaker systems use multiple limited-range speaker drivers to cover the different segments of the range of frequencies that humans can perceive. The loudspeaker systems use crossover filters to split an amplifier output signal into separate bands, specific to frequency ranges covered by the individual speaker drivers. However, the crossover filters are not phase linear, which distorts the directional information, and also there is spillover between adjacent frequency bands, resulting in harmonic distortion.

The use of full-range speaker drivers can prevent the distortion caused by crossover filters, but the material of which the loudspeaker cabinet is made can resonate if it is not stiff enough, and produce harmonics and therefore harmonic distortion. Whereas even harmonics (overtones) may just change the "color" of the sound, odd harmonics are usually not present in the sound produced by the original sources, such as voices and musical instruments, and they can easily be perceived as distortion. The internal arrangement of panels in the cabinet may create the possibility of standing waves. For example in a conventional speaker cabinet, parallel front and back panels at 50 centimeters apart would allow a standing wave of 600 Hz, and therefore create a resonance frequency of 600 Hz. Again, for a fundamental frequency or even overtone, this would merely discolor the sound, but for an odd overtone, for example the third harmonic of 200 Hz or the fifth harmonic of 120 Hz, this would amplify the distortion. The use of damping material may lower the speed of sound between the panels, depending on the material, the amount of material, and whether it's applied to the cabinet walls only or throughout the cabinet. Lowering the speed of sound will result in lower resonance frequencies, and thus in more resonance frequencies within the audible range, but the damping material would also absorb some of the energy and lower the resonance peaks.

The technology disclosed herein solves these problems by mounting multiple full-range speaker drivers in a loudspeaker cabinet of which the internal cavity is shaped as a tapered tunnel. The tapered tunnel has openings at its wide end and its narrow end. Because the tunnel is narrow, fewer resonance frequencies would be in the audible range. Because it is tapered, standing waves and thus resonance frequencies are effectively avoided. The cabinet cavity is filled with damping material, whose fill density is substantially uniform throughout the cabinet cavity. The fill density is markedly higher than in conventional loudspeaker cabinets. The narrowing of the top tunnel from the speaker drivers towards a first opening allows for a tighter bass control, extremely low resonance, and clarity throughout the frequency range, and the widening of the bottom tunnel towards a second opening allows for the same. Therefore, by adding both openings to the loudspeaker cabinet, the sound becomes brighter, and distortion can be almost non-existent. Music, speech, and all other sounds come alive.

The technology allows for sound to be produced with extremely low distortion because no standing waves can develop, and high efficiency because parts of the sound emanate directly from the front of the speaker drivers and other parts of the sound emanate from the top and bottom openings. The combination of the cavity size and shape, the fill material, and the two openings prevents sound from bouncing back to the speaker drivers so that no discoloration of the sound occurs.

Loudspeaker cabinets created in the disclosed technology provide superbly natural sound with an unmatched stereo clarity. Once the design is complete and has been tested, it can be manufactured in volume with identical performance.

Terminology

As used herein, the phrase one of should be interpreted to mean exactly one of the listed items. For example, the phrase one of A, B, and C should be interpreted to mean any of: only A, only B, or only C.

As used herein, the phrases at least one of and one or more of should be interpreted to mean one or more items. For example, the phrase at least one of A, B, and C or the phrase at least one of A, B, or C should be interpreted to mean any combination of A, B, and/or C.

Unless otherwise specified, the use of ordinal adjectives first, second, third, etc., to describe an object, merely refers to different instances or classes of the object and does not imply any ranking or sequence.

The term coupled is used in an operational sense and is not limited to a direct or an indirect coupling. Coupled to is generally used in the sense of directly coupled, whereas coupled with is generally used in the sense of directly or indirectly coupled. Coupled in an electronic system may refer to a configuration that allows a flow of information, signals, data, or physical quantities such as electrons between two elements coupled to or coupled with each other. In some cases the flow may be unidirectional, in other cases the flow may be bidirectional or multidirectional. Coupling may be mechanical, galvanic (in this context meaning that a direct electrical connection exists), capacitive, inductive, electromagnetic, optical, or through any other process allowed by physics.

The term connected is used to indicate a direct connection, such as electrical, optical, electromagnetic, or mechanical, between the things that are connected, without any intervening things or devices.

The term configured to perform a task or tasks is a broad recitation of structure generally meaning having circuitry that performs the task or tasks during operation. As such, the described item can be configured to perform the task even when the unit/circuit/component is not currently on or active. In general, various items may be described as performing a task or tasks, for convenience in the description. Such descriptions should be interpreted as including the phrase configured to.

As used herein, the term based on is used to describe one or more factors that affect a determination. This term does not foreclose the possibility that additional factors may affect the determination. That is, a determination may be solely based on specified factors or based on the specified factors as well as other, unspecified factors. Consider the phrase determine A based on B. This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase based on is thus synonymous with the phrase based at least in part on.

The terms substantially, close, approximately, near, and about refer to being within minus or plus 10% of an indicated value, unless explicitly specified otherwise.

The fill density of a cabinet cavity is the weight of the fill material inside the cabinet cavity divided by the effective volume of the cabinet cavity. The effective volume may take into account that part of the cabinet cavity is occupied by speaker drivers, and that a part of the cabinet cavity, for instance in front of a sound deflector near an opening, may not be filled with fill material. The fill density is much lower than the material density of the fill material, as the fill material typically comes in the form of fibers separated by air.

Full range—a full-range speaker driver is generally considered a speaker driver that covers a large part of the audio spectrum that humans can hear, for example from 90 Hz to 20,000 Hz, or wider.

The material density of a fill material is the weight of the fill material divided by the volume occupied by the fill material when it is fully compressed, i.e., when there is no air in the material.

Implementations

FIG. 1 illustrates an example loudspeaker cabinet 100 shaped as a tower, in a three-dimensional view. Loudspeaker cabinet 100 comprises four panels, including a front panel 102, a back panel 103 a first panel 104, which may be a side panel, and which is connected with front panel 102 and back panel 103, and a second panel 105, which may be another side panel, and which is also connected with front panel 102 and back panel 103. Front panel 102, back panel 103, first panel 104, and second panel 105 jointly enclose an elongated and tapered cabinet cavity 109 which has a first opening at the first end (for example, an opening at the top end of cabinet cavity 109, between the four panels) and a second opening at the second end (for example, an opening below arch 101 in front panel 102 at the bottom end of cabinet cavity 109). In other implementations, the first opening may be located at a different place substantially at the first end; for example, it may be located at the top of front panel 102 or back panel 103. Similarly, the second opening may be located at a different place substantially at the second end; for example, it may be located in a base plate 115 at which the four panels are mounted, and which is elevated above the floor by feet or adjustable screws 125. Or it may be an opening at the bottom of back panel 103.

Front panel 102 has two or more instances of a driver opening 106, in which speaker drivers are mounted. Implementations in the form of a soundbar may have one or more instances of a driver opening in which a speaker driver is mounted.

The four panels may be made of any material used in the art for loudspeaker cabinets, for example wood or concrete. An implementation can use any wood type such as mahogany, walnut, poplar, pine, cherry, etc. A heavy (or inflexible) material produces less harmonic distortion. The weight of a hardwood loudspeaker cabinet may be equal to or more than 10 kilograms excluding the weight of speaker drivers. The thickness of the panels may be any thickness used in the art for panels of loudspeaker cabinets, for example 19 millimeters (three quarters of an inch (0.75 inch)).

Cabinet cavity 109 is elongated and tapered. For example, cabinet cavity 109 may have a first perimeter at the first end and a second perimeter at the second end. The ratio of the first perimeter and the second perimeter is less than eight tenths (0.8). The ratio of the length of the cabinet cavity and the second perimeter is at least two (2). In some implementations, the height of the cabinet cavity, or the height of the loudspeaker cabinet excluding any base plate or feet/adjustable screws 125, may be seventy-two (72) inches or more. The first perimeter may be fifteen (15) inches or less. The second perimeter may be nineteen (19) inches or more.

To achieve the tapering of the cabinet cavity, the front panel 102 and back panel 103 may be tilted toward each other as drawn (the distance 113 between front panel 102 and back panel 103 near the second end of cabinet cavity 109 is larger than distance 114 near the first end of cabinet cavity 109). In another implementation, the first panel 104 and second panel 105 may be tilted toward each other, and in yet another implementation, all four panels may be tilted toward each other.

A speaker driver is mounted in each driver opening 106 in the front panel. The centers of the speaker drivers are within a critical distance range from each other, as detailed below.

The cabinet cavity 109 is filled with damping material. The damping material has a material density and a fill density (the meaning of these terms is explained in the Terminology section above). Some example damping materials are polyester fiber, fiberglass, long-fiber wool, hemp fiber, Dacron, etc. The damping material has a substantially uniform fill density (within a fill density range) throughout the cabinet cavity. For example, polyester may have a material density of 1.22-1.38 kilograms per liter. Polyester fiber, which contains a lot of air, may have a much lower density. When the cabinet cavity is fully filled with polyester fiber, the fill density may be in the range of 0.030-0.070 kilograms per liter, or 2.1 to 5% of the material density. While this number seems low, it is significantly more than what is recommended for conventional loudspeaker cabinets, where it is just 1 to 2%. In general, in the technology presented herein, the material density may be in the order of 1.0 to 2.5 kilograms per liter, where polyester ranges from 1.22-1.38 kg/I, wool may be about 1.31 kg/I, cotton 1.54-1.56 kg/I, and fiberglass 1.5-2.4 kg/I. The fill density may be proportional to the material density (at 2.1 to 5%). Thus, the resulting fill density range is from 2.1% of 1.0 to 5% of 2.5 kg/I, or 0.021 to 0.125 kg/I.

The fill density may be constant throughout the cabinet cavity. However, it is possible to tweak the loudspeaker cabinet's frequency response by adding some fill material in the top tunnel to enhance bass response or adding some fill material in the bottom tunnel to reduce the bass response.

Figure 2:
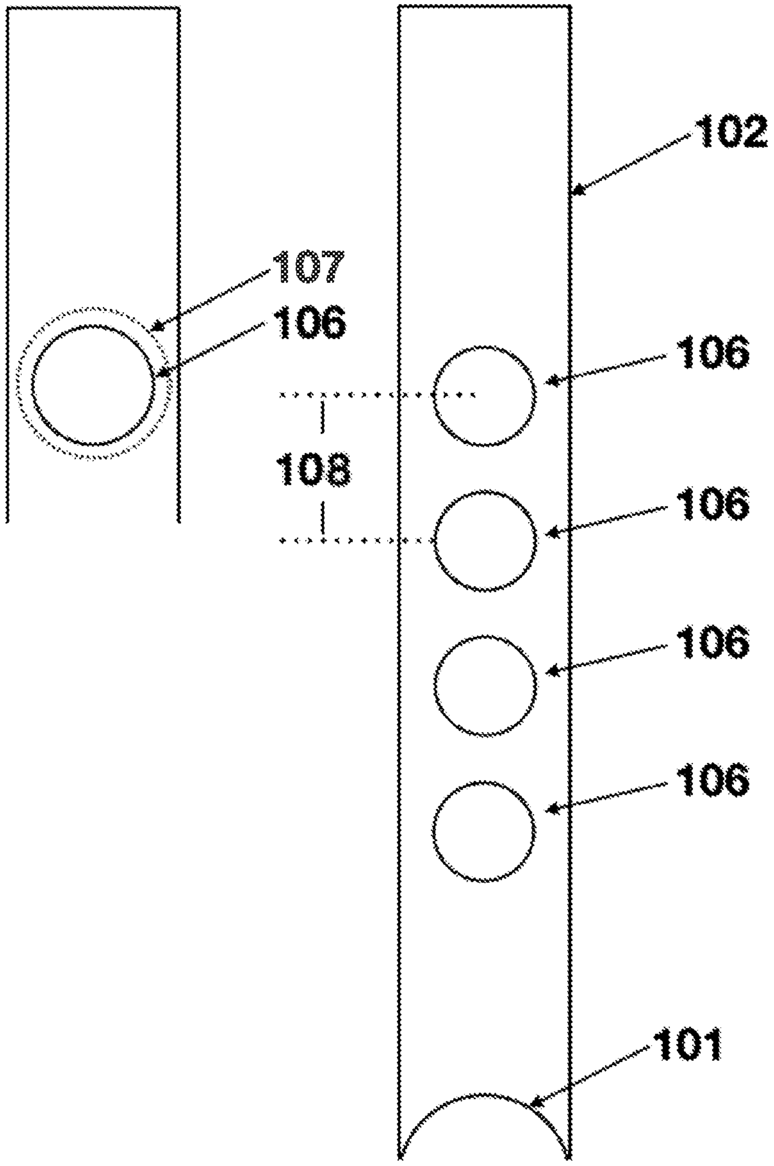
FIG. 2 illustrates details of the example front panel.

FIG. 2 illustrates details of the example front panel 102. Front panel 102 has two or more instances of a driver opening 106 that is configured for mounting a speaker driver. FIG. 2 shows an implementation with four driver openings, but other implementations may have any number of driver openings (an implementation of a soundbar may have one or more instances of a driver opening and speaker driver). The driver openings may be flared, that is, the backside (inside cabinet cavity 109) may have a larger diameter 107 than the front of driver opening 106. The two or more driver openings may have identical sizes to support mounting identical speaker drivers. The speaker drivers may be full-range drivers, covering substantially equal frequency ranges, for example to provide a loudspeaker cabinet 100 frequency range of 50 to 20,000 Hertz. The speaker drivers may be configured to be driven by a shared signal without intervening filters that split the shared signal into separate frequency ranges. The driver openings are located within a critical distance 108 from one another. For example, the range of the critical distance 108 may be between five (5) and ten (10) inches. For example, critical distance 108 may be seven-and-a-half (7.5) inches.

Arch 101 allows having the first opening at the bottom end of front panel 102, substantially at the second end of cabinet cavity 109. Arch 101 allows sound from within loudspeaker cabinet 100 to be easily pushed out, avoiding distortion.

Figure 3:
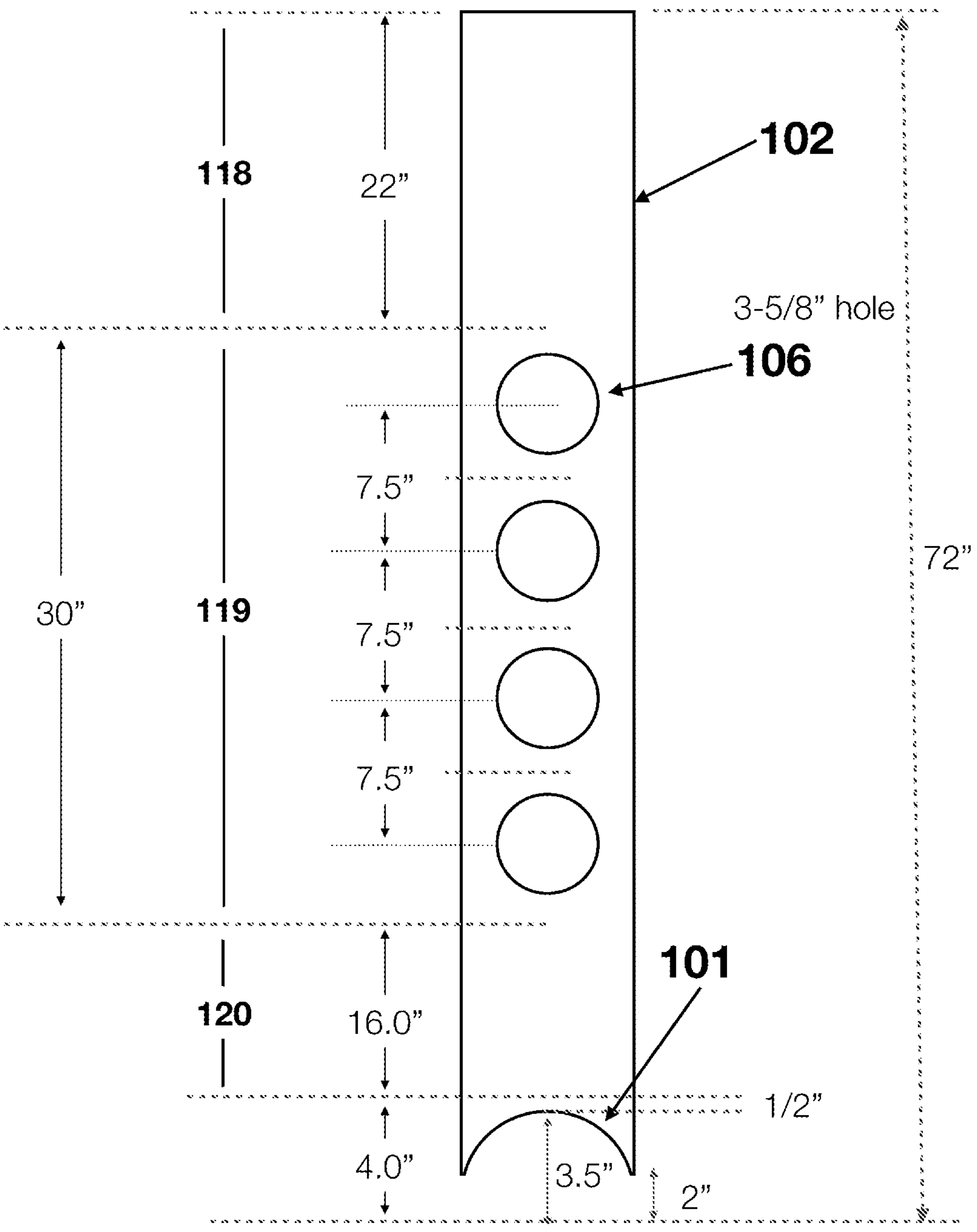
FIG. 3 illustrates further details about example dimensions of the example front panel.

FIG. 3 illustrates further details about example dimensions of the example front panel 102. Front panel 102 may support a cabinet cavity 109 of seventy-two (72) inches, and in that case be up to seventy-two (72) inches tall, less any height used for the first opening or the second opening. Its width may be five-and-a-half (5.5) inches, and driver opening 106 may have an outside diameter of three and five-eighths of an inch (3⅝"). Cabinet cavity 109 is partitioned in three sections: a first section 118 ranges from the first opening to the top of the drivers section 119, which starts at half the critical distance 108 above the center of the highest driver opening 106. A second section 120 ranges from the bottom of the drivers section 119 (starting at half the critical distance 108 below the lowest driver opening 106) to the top of arch 101 (or to the top of the second opening if the second opening does not have an arch). The three sections of cabinet cavity 109 may be filled with damping material, where the damping material throughout cabinet cavity 109 has a substantially uniform fill density.

Research by the inventor found that with damping material as specified herein, each individual speaker driver (activated separately from the other speaker drivers) produced a frequency response similar to its open-baffle frequency response. When all four speakers were mounted in loudspeaker cabinet 100 and jointly activated but separately measured, the frequency response was again similar to the open-baffle frequency response. This allows the speaker drivers to be activated without any cross-over filters (or frequency equalizers) to manipulate frequency response. Adding damping material allows for extending the loudspeaker cabinet 100 frequency response, or optimizing it for any particular type of sound.

In the implementation of FIG. 3, the first section has a height of 22 inches, and the second section has an effective height of 16 inches. Arch 101 has a height of two inches, and begins two inches above the bottom of the loudspeaker cabinet. In another implementation, arch 101 begins at the bottom of the loudspeaker cabinet, so that the second section 120 has an effective height of 16 inches. This may extend the lower end of the frequency range of the loudspeaker cabinet.

Figure 4:
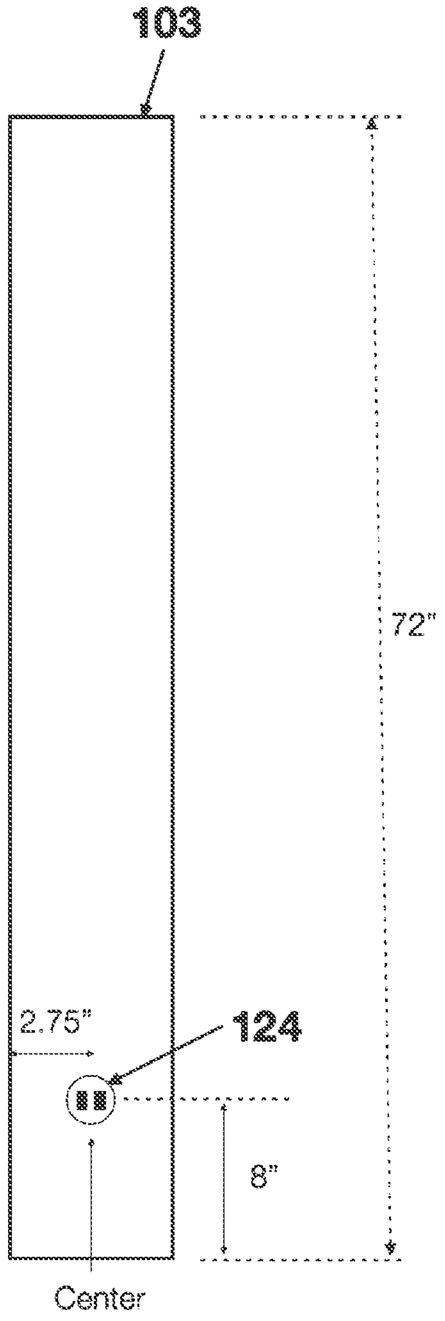
FIG. 4 illustrates details of an example back panel.

FIG. 4 illustrates details of the example back panel 103. In this case, neither the first opening nor the second opening is located in the back panel, therefore, its length can be the full 72 inches (or whatever length an implementation has been designed for). At the bottom, back panel 103 features a connector 124 with positive and negative terminals. A wire of reasonable gauge can be used to couple connector 124 with a high-quality audio amplifier. Internally in loudspeaker cabinet 100, connector 124 is electrically coupled with the speaker drivers. For example, in an implementation with four speaker drivers of 8 ohms each, two pairs of speaker drivers are coupled in series, and each pair is coupled in parallel. Such an arrangement preserves the overall impedance of 8 ohms and ensures that each driver is activated with substantially the same signal. Implementations with a different number of speaker drivers, or with speaker drivers that have a different impedance than 8 ohms, or in which a different overall impedance is required than 8 ohms, may feature other arrangements of speaker driver wiring.

Figure 5:
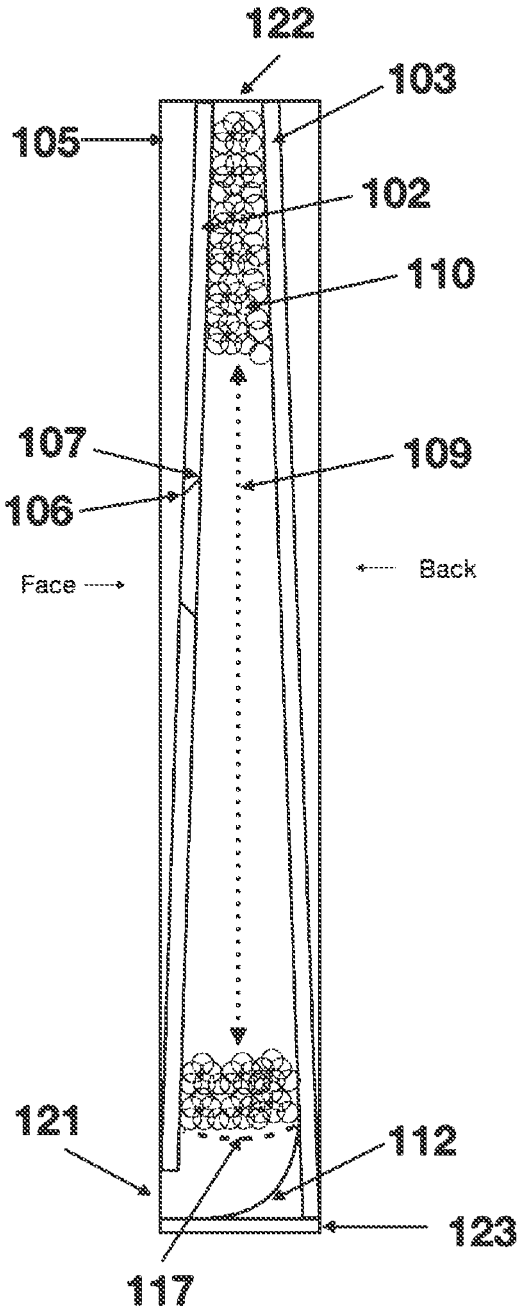
FIG. 5 illustrates an example sectional side view of the loudspeaker cabinet.

FIG. 5 illustrates an example sectional side view of loudspeaker cabinet 100. This view shows cabinet cavity 109 with at its top first opening 122 and at its bottom second opening 121. Cabinet cavity 109 is partially or fully filled with damping material 110, which may be a sound absorbing material such as polyester fiber fill. Damping material 110 has a substantially uniform fill density throughout cabinet cavity 109, such as was discussed with reference to FIG. 3.

Whereas first opening 122 in this example is simply an opening where the four panels come together but don't close, second opening 121 is located below front panel 102. A sound deflector 112, which may be in the shape of a curved surface, redirects sound waves traveling down cabinet cavity 109 to the front. Sound deflector 112 may be made of any suitable material that reflects sounds without causing harmonic distortion. For example, in one implementation, two curved copper plates of 1/16 inch thickness are joined to create the desired shape. In another implementation, sound deflector 112 may be carved out of a suitably hard wood, or shaped in a hard plastic material. A fabric 117, for example a mesh fabric, is mounted above sound deflector 112 and second opening 121, and serves to stop damping material 110 from falling down. A bottom piece 123 may be connected to back panel 103, first panel 104, and second panel 105. In some cases, bottom piece 123 equals base plate 115.

Figure 6:
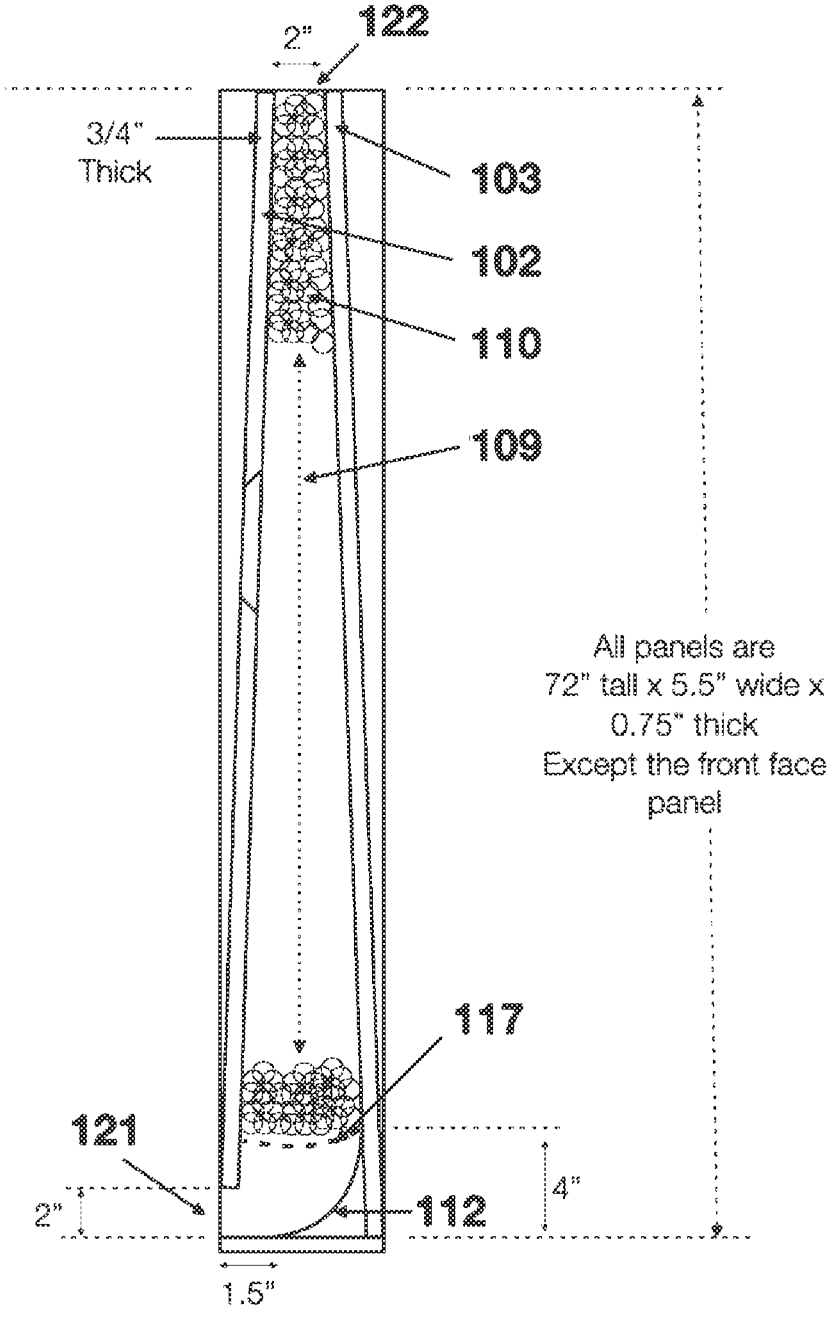
FIG. 6 illustrates example dimensions of the example sectional side view of the loudspeaker cabinet.

FIG. 6 illustrates example dimensions of the example sectional side view of loudspeaker cabinet 100. In this example, the height of loudspeaker cabinet 100 is about 72 inches. Cabinet cavity 109 ranges from a perimeter of 15 inches (=2+5.5+2+5.5) at first opening 122 to about 19 inches (=(5.5−0.75−0.75)+5.5+(5.5−0.75−0.75)+5.5) at second opening 121. Fabric 117 is positioned at about 4 inches from bottom piece 123 or base plate 115.

Figure 7:
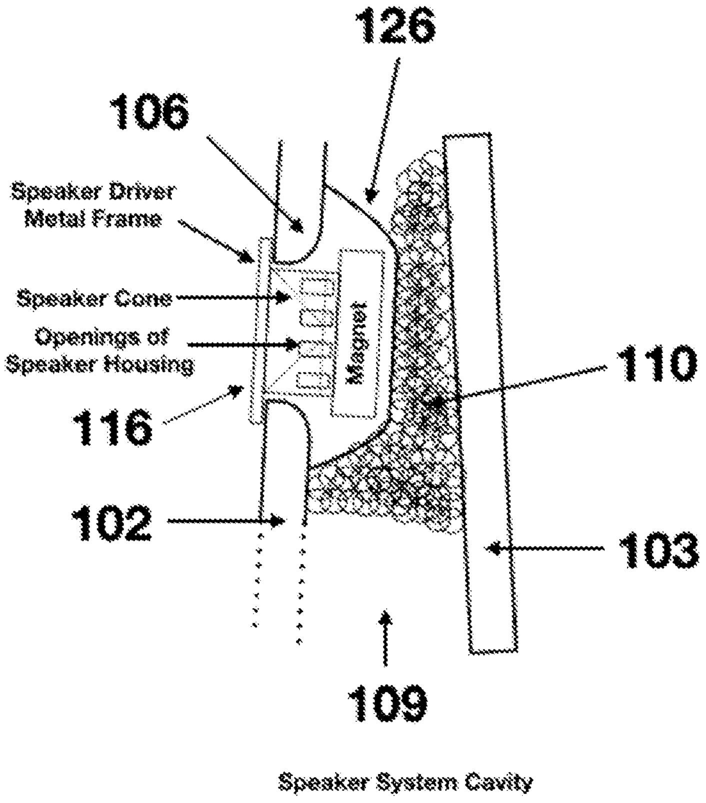
FIG. 7 illustrates a sectional side view of an example section that includes a speaker driver.

FIG. 7 illustrates a sectional side view of an example section that includes a speaker driver 116. Speaker driver 116 is mounted in driver opening 106 in front panel 102 and may be covered with a cloth 126 that prevents damping material 110 moving into the back cone cavity of speaker driver 116, which would restrict cone movement and lead to high distortion. Cloth 126 may be made of any suitable fabric, for example a mesh fabric, towel type material, cotton, or any other type of cloth. Although FIG. 7 shows speaker driver 116 as a conventional dynamic speaker with a cone, a permanent ferrite magnet, and a voice coil mounted to a coil former attached to the cone, an implementation may use any other type of electroacoustic transducers, such as electrostatic loudspeakers, magnetostatic loudspeakers, magnetorestrictive loudspeakers, bending wave loudspeakers, and plasma loudspeakers.

Figure 8:
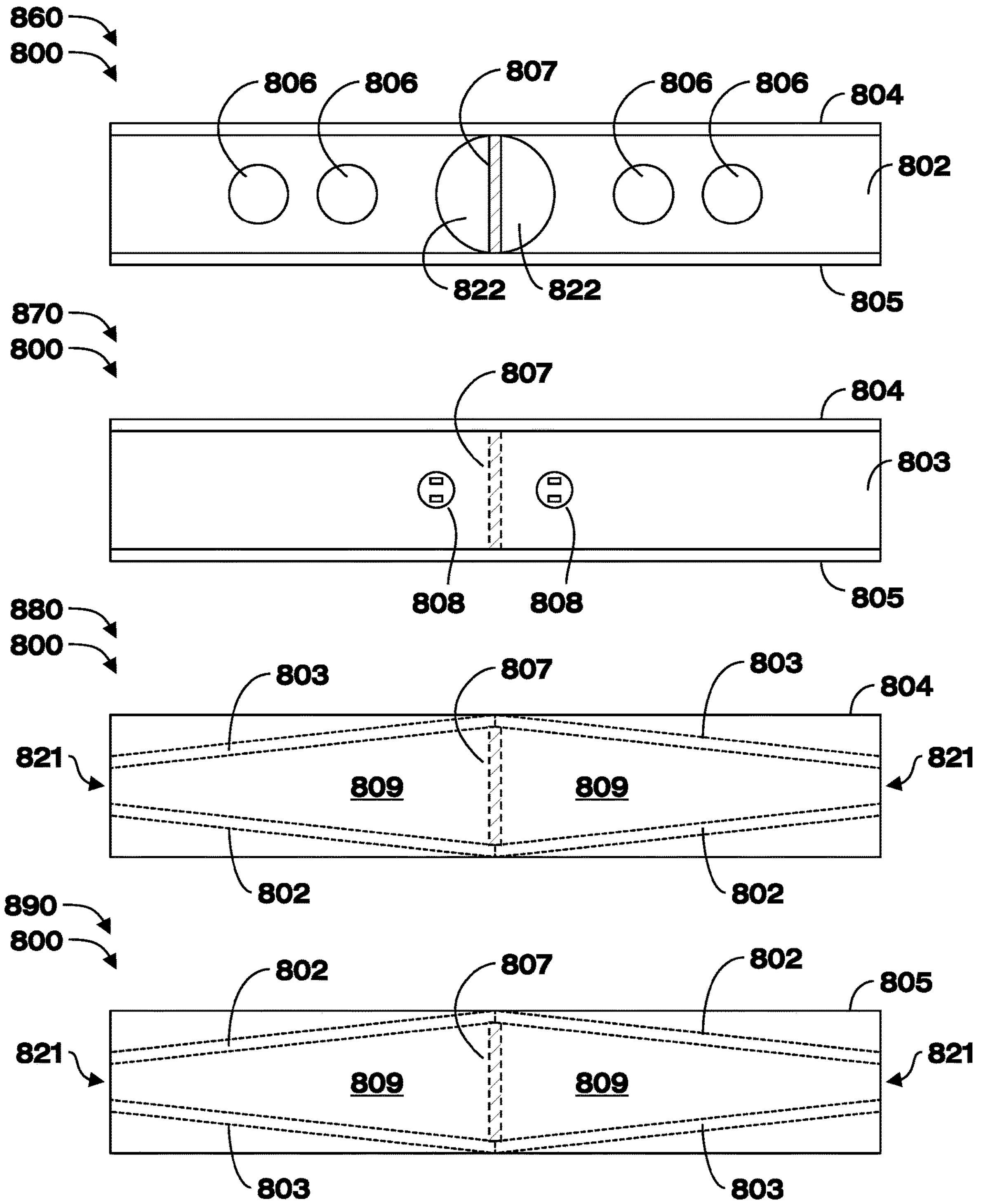
FIG. 8 illustrates an example loudspeaker cabinet shaped as a sound bar.

FIG. 8 illustrates an example loudspeaker cabinet 800 shaped as a sound bar. FIG. 8 shows a front view 860, a back view 870, a top view 880, and a bottom view 890. A front panel 802 and a back panel 803 connect with a first panel 804, which may be a top panel, and with a second panel 805, which may be a bottom panel. Loudspeaker cabinet 800 is separated in two parts via a separation panel 807 which may be internal to loudspeaker cabinet 800. Front panel 802 has one or more driver openings 806 in each of the two parts. Further, each part has a first opening 821 near an end of loudspeaker cabinet 800, for example in between the ends of front panel 802, back panel 803, first panel 804, and second panel 805, and a second opening 822 near the center of loudspeaker cabinet 800, for example in front panel 802. The back panel 803 may carry one or more connectors 808, each of which can be coupled with speaker drivers mounted in the driver openings 806 to provide a sound channel. For example, if loudspeaker cabinet 800 is configured to carry a single sound channel, then a single connector may be coupled with all speaker drivers. If loudspeaker cabinet 800 is configured to carry stereo channels, then each of two connectors 808 is coupled with loudspeakers for a left or a right channel.

Loudspeaker cabinet 800 encloses two cabinet cavities 809, each of which is tapered and forms a tapered tunnel whose narrowest end is at first opening 821 and whose widest end is at second opening 822. In an implementation, one of the cabinet cavities 809 can carry the left channel of a stereo signal, and the other can carry the right channel. In another implementation, both cabinet cavities 809 carry the same signal, for example of a center channel, provided by an amplifier.

Separation panel 807 may be a wood (or other) separation between the two cabinet cavities 809. Some systems may be switchable between stereo and mono operation, and incorporate wiring and/or one or more resistors to ensure that the speaker impedance matches an impedance target, such as for example eight ohms.

At least one of the four panels front panel 802, back panel 803, first panel 804, and second panel 805 needs to comprise two halves that are not in a straight plane. As drawn, each front panel 802 and back panel 803 comprises two halves that are not co-planar, and that are wedged between first panel 804 and second panel 805. In other implementations, front panel 802 and back panel 803 may be co-planar panels, and first panel 804 and/or second panel 805 may be panels whose two halves are not co-planar, and first panel 804 and second panel 805 may be wedged between front panel 802 and back panel 803.

Internally, each of the cabinet cavities 809 is organized in the same manner as cabinet cavity 109 of loudspeaker cabinet 100. That is, the tapered tunnel may be divided into several sections, each filled with damping material of a relevant density. All speaker drivers may be full-range speaker drivers, and be separated from the damping material by a cloth such as cloth 126.

A particular implementation of loudspeaker cabinet 800 may be sixty (60) inches wide, which is perfectly suited for a sound bar under a 70" television monitor. Each cabinet cavity may have two (or more) speaker drivers, that are identical to each other.

CONSIDERATIONS

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other materials, features, elements, methods and implementations. Implementations are described to illustrate the present technology, not to limit its scope, which is defined by the claims. Those of ordinary skill in the art recognize a variety of equivalent variations on the description above. For example, although the examples feature loudspeaker cabinets with two or four speaker drivers per channel, implementations may have any number of speaker drivers per channel. The figures show the first opening as the location where two out of four panels get closer together. But in implementations, any number of panels may come closer together, and the first opening may be in the front panel or in the back panel. The figures show the second opening in the front panel, but implementations may have the first opening in the back panel or in the bottom plate.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A loudspeaker cabinet, comprising:
a front panel;
a back panel;
a first panel physically coupled with the front panel and the back panel;
a second panel physically coupled with the front panel and the back panel;
wherein the front panel, back panel, first panel, and second panel jointly enclose a cabinet cavity, the cabinet cavity having a first opening substantially at a first end and a second opening substantially at a second end;
two or more speaker drivers mounted in the front panel, wherein centers of the speaker drivers are mounted within a critical distance range from each other;
damping material with a material density and a fill density inside the cabinet cavity; and
the fill density is within a fill density range from 2.1 to 5% of the material density;
wherein:
a ratio of a first perimeter of the cabinet cavity at the first end divided by a second perimeter of the cabinet cavity at the second end is less than eight tenths (0.8);
a ratio of a length of the cabinet cavity divided by the second perimeter is at least two (2);
at least two of the two or more speaker drivers are configured to cover substantially equal frequency ranges; and
an inside of the front panel and an inside of the back panel are tilted towards each other, and/or an inside of the first panel and an inside of the second panel are tilted toward each other.

2. The loudspeaker cabinet of claim 1, wherein:
the first opening and/or the second opening is in the front panel.

3. The loudspeaker cabinet of claim 1, wherein:
the first opening and/or the second opening is in the back panel.

4. The loudspeaker cabinet of claim 1, further comprising:
a first sound deflector behind the first opening and/or a second sound deflector behind the second opening.

5. The loudspeaker cabinet of claim 1, wherein:
the fill density of the damping material is substantially uniform throughout the cabinet cavity.

6. The loudspeaker cabinet of claim 1, wherein:
the loudspeaker cabinet is shaped as a tower;
the length of the cabinet cavity is a height of the cabinet cavity;
the first panel and the second panel are side panels; and
the first end of the cabinet cavity is a top end and the second end of the cabinet cavity is a bottom end.

7. The loudspeaker cabinet of claim 6, wherein:
four or more speaker drivers are mounted in the front panel;
a height of the loudspeaker cabinet is seventy-two (72) inches or more;
the critical distance range is from five (5) to ten (10) inches;
the first perimeter is fifteen (15) inches or less; and
the second perimeter is nineteen (19) inches or more.

8. The loudspeaker cabinet of claim 7, wherein:
a first section of the cabinet cavity, above a drivers section, is at least twenty-two (22) inches; and
a second section of the cabinet cavity, below the drivers section, is at least sixteen (16) inches, wherein:
the drivers section extends from half the critical distance above a highest driver opening to half the critical distance below a lowest driver opening.

9. The loudspeaker cabinet of claim 1, wherein:
the loudspeaker cabinet is shaped as a sound bar;
a length of the cabinet cavity is a width of the cabinet cavity;
the first panel and the second panel are top and bottom panels; and
the first end of the cabinet cavity is a first side end and the second end of the cabinet cavity is a second side end.

10. The loudspeaker cabinet of claim 1, wherein:
the material density is 1.0 to 2.5 kilograms per liter; and
the fill density range is from 0.025 to 0.125 kilograms per liter.

11. The loudspeaker cabinet of claim 1, wherein:
the two or more speaker drivers are full-range drivers configured to be driven by a shared signal without an intervening filter that splits the shared signal into separate frequency ranges.

12. A loudspeaker cabinet, shaped as a sound bar, comprising:
a front panel;
a back panel;
a top panel physically coupled with the front panel and the back panel;
a bottom panel physically coupled with the front panel and the back panel;
wherein the front panel, back panel, top panel, and bottom panel jointly enclose a cabinet cavity, the cabinet cavity having a first opening substantially at a first side end and a second opening substantially at a second side end;
a speaker driver mounted in the front panel;
damping material with a material density and a fill density inside the cabinet cavity; and
the fill density is within a fill density range from 2.1 to 5% of the material density;
wherein:
a ratio of a first perimeter of the cabinet cavity at the first end divided by a second perimeter of the cabinet cavity at the second end is less than eight tenths (0.8);
a ratio of a length of the cabinet cavity divided by the second perimeter is at least two (2); and
an inside of the front panel and an inside of the back panel are tilted towards each other, and/or an inside of the top panel and an inside of the bottom panel are tilted toward each other.

13. The loudspeaker cabinet of claim 12, wherein:
the fill density of the damping material is substantially uniform throughout the cabinet cavity.

* * * * *